US006015839A

United States Patent [19]

Milius

[11] Patent Number: 6,015,839

[45] Date of Patent: Jan. 18, 2000

[54] ANTI-FOAMING COMPOSITION

[75] Inventor: Alain Milius, Nice, France

[73] Assignee: Societe d'Exploitation de Produits pour les Industries Chimiques SEPPIC, Paris Cedex, France

[21] Appl. No.: 08/860,101

[22] PCT Filed: Apr. 19, 1996

[86] PCT No.: PCT/FR96/00600

§ 371 Date: Jul. 3, 1997

§ 102(e) Date: Jul. 3, 1997

[87] PCT Pub. No.: WO96/33255

PCT Pub. Date: Oct. 24, 1996

[30] Foreign Application Priority Data

Apr. 21, 1995 [FR] France ................................... 95 04827

[51] Int. Cl.[7] ................................ B01D 19/04; C11D 1/72

[52] U.S. Cl. .......................... 516/134; 516/204; 510/235; 510/535

[58] Field of Search .................................... 252/321, 358; 516/134, 204; 510/535, 235

[56] References Cited

U.S. PATENT DOCUMENTS

| | | | |
|---|---|---|---|
| 3,567,784 | 3/1971 | Tsatsos et al. | 568/625 |
| 3,752,857 | 8/1973 | Milligan | 568/625 |
| 3,956,401 | 5/1976 | Scardera et al. | 252/351 |
| 4,070,298 | 1/1978 | Scardera et al. | 252/351 |
| 4,134,854 | 1/1979 | Milligan | 252/351 |
| 4,240,921 | 12/1980 | Kaniecki | 252/321 |
| 4,836,951 | 6/1989 | Totten et al. | 252/321 |
| 4,923,976 | 5/1990 | Arnaudis | 536/18.6 |
| 5,154,850 | 10/1992 | Deguchi et al. | 510/420 |
| 5,205,959 | 4/1993 | Schmid et al. | 252/321 |
| 5,556,573 | 9/1996 | Weuthen et al. | 510/535 |
| 5,681,949 | 10/1997 | Johansson et al. | 536/123.1 |
| 5,928,993 | 7/1999 | Johansson | 516/204 |

FOREIGN PATENT DOCUMENTS

| | | |
|---|---|---|
| 0 077 167 | 4/1983 | European Pat. Off. . |
| 0 408 965 | 1/1991 | European Pat. Off. . |
| 40 09 533 | 9/1991 | Germany . |
| 43 19 700 | 12/1994 | Germany . |
| 44 04 199 | 8/1995 | Germany . |
| WO 91/03538 | 3/1991 | WIPO . |
| WO 94/21655 | 9/1994 | WIPO . |

OTHER PUBLICATIONS

Database WPIDS on STN, week 9140, London: Derwent Publications Ltd., AN 91-289038, class A97, DE 40 09 533 A (Henkel KGAA), Abstract, 1991.

*Primary Examiner*—Richard D. Lovering
*Assistant Examiner*—Daniel S. Metzmaier
*Attorney, Agent, or Firm*—Young & Thompson

[57] ABSTRACT

An anti-foaming composition and a cleaning composition including at least one defoaming nonionic surfactant and at least one alkylpolyglycoside of formula (I): $ROZ_n$, in which R is a 2-ethylhexyl radical, Z is a saccharoid residue, and n is between 1 and 5.

3 Claims, No Drawings

ANTI-FOAMING COMPOSITION

This application is filed under 35 U.S.C 371 based on PCT/FR96/00600, filed Apr. 19, 1996.

BACKGROUND OF THE INVENTION

The present invention relates to anti-foaming compositions comprising at least one nonionic defoaming surfactant as well as a solubilizing agent.

DESCRIPTION OF THE RELATED ART

Certain cleaning compositions in industrial cleaning operations, such as the cleaning of bottles or, the washing of floors, may lead to the formation of a large amount of foam. This is due in particular to the presence of food soiling or adhesive residues present on the bottles. In order to reduce, or even prevent, the formation of this foam, it is known to add one or more defoaming surfactants to the cleaning composition. These defoaming surfactants are generally of the nonionic type. However, these defoaming surfactants are of limited use on account of their low solubility in very concentrated alkaline cleaning compositions, which may comprise up to 50% by weight of sodium hydroxide or of potassium hydroxide. Under these conditions, the said defoaming surfactants are sparingly soluble. In order to avoid having to decrease the concentration of alkaline agents to the detriment of the cleaning performance, it is known to combine the defoaming surfactant with solubilizing agents such as cumene sulfonates and xylene sulfonates or organic solvents.

Alkylpolyglycosides have also been described as solubilizing agents for nonionic defoaming surfactants. Alkylpolyglycosides are well-known nonionic surfactants. Their manufacturing process is described, for example, in patent application EP-A-0, 077, 167.

Patent application EP-A-0, 489, 777 describes anti-foaming compositions comprising alkylpolyglycosides whose alkyl chain comprises from 6 to 12 carbon atoms. However, the only alkylpolyglycosides marketed to date as solubilizing agents for defoaming nonionic surfactants are 50/50 mixtures (by weight) of alkylpolyglycosides having, respectively, an alkyl chain containing 8 carbon atoms and an alkyl chain containing 10 carbon atoms. This type of solubilizing agents [sic] is marketed by the company Union Carbide under the brand name Triton BG 10.

SUMMARY OF THE INVENTION

A first subject of the present invention consists of an anti-foaming composition comprising a nonionic surfactant and a specific alkylpolyglycoside, this composition having a good power for solubilizing the defoaming surfactant.

According to another aspect, the invention also relates to a cleaning composition comprising an anti-foaming composition based on (i) a defoaming nonionic surfactant and (ii) the said specific alkylpolyglycoside.

The invention thus relates to an anti-foaming composition comprising at least one defoaming nonionic surfactant and at least one alkylpolyglycoside of formula (I):

$$R(O)Z_n \qquad (I)$$

in which:

R represents a 2-ethylhexyl radical,

Z is a sugar residue, and n is between 1 and 5.

It has been observed that such an alkylpolyglycoside makes it possible, surprisingly, to reinforce the anti-foaming effect of the said nonionic surfactant. There is thus genuine synergism between the latter and the compound of formula (I).

The residue Z may be chosen from the residues of the following compounds: glucose, dextrose, sucrose, fructose, galactose, maltose, maltotriose, lactose, celobiose, mannose, ribose, dextran, tallose, xylose and levoglucosan. Among these compounds, dextrose, fructose and maltose are preferred, glucose being most particularly preferred.

According to an advantageous aspect of the invention, n is between 1.1 and 2.

The nonionic defoaming surfactants according to the invention are generally chosen from those comprising one or more groups chosen from monoethoxylated (EO) or polyethoxylated (PEO) groups, of formula $(CH_2CH_2O)n$, and monopropoxylated (PO) or polypropoxylated (PPO) groups, of formulae

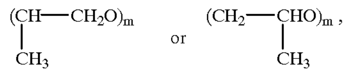

n and m, which may be identical or different, being between 1 and 50. A nonionic defoaming surfactant according to the invention may contain one or more ethoxylated or propoxylated groups, these groups being distributed in a random or block manner. These ethoxylated or propoxylated groups may or may not be blocked with a $C_4$–$C_8$ alkyl radical, preferably a butyl radical, with a benzyl radical or with butylene oxide. The term "blocked" is understood to mean that these groups contain, at the end of the chain, not a hydrogen atom but a radical as mentioned. above.

Nonionic defoaming surfactants which are preferred in the context of the present invention may be represented by the general formula:

$$R\text{-}X\text{-}[(PO)_d\text{-}EO)_a\text{-}Y]_n$$

in which:

- R represents a hydrophobic group preferably chosen from linear or branched alkyl groups having from 6 to 14 carbon atoms;
- X represents a nitrogen atom or an oxygen atom;
- EO represents an ethylene oxide group ($CH_2$-$CH_2O$);
- PO represents a propylene oxide group $CH_2$-$CH(CH_3)$-O or $CH(CH_3)$-$CH_2$-O;
- a represents an integer between 1 and 50;
- d represents an integer between 0 and 50;
- Y represents a hydrogen atom or a blocking group chosen from an alkyl radical having from 4 to 8 carbon atoms, preferably a butyl radical, a benzyl radical, a butylene oxide group; or alternatively a group $(PO)_bH$ or $[(PO)_b$-$(EO)_cH]$ in which b and c independently represent an integer between 1 and 50; and
- n is equal to 1 when X represents an oxygen atom and n is equal to 2 when X represents a nitrogen atom.

The nonionic defoaming surfactants that are particularly preferred in the context of the present invention are chosen from the group consisting of polyethoxylated amines, polyethoxylated and polypropoxylated amines, polyethoxylated alcohols blocked with a $C_4$–$C_8$ radical, preferably blocked with a butyl radical, or alternatively blocked with a benzyl radical or butylene oxide, and polyethoxylated and/or polypropoxylated alcohols.

The nonionic defoaming surfactants which are most particularly preferred are those of formula (II):

$$R_1O-(CH_2CH_2O)_a-(\underset{\displaystyle CH_3}{CH}-CH_2O)_b(CH_2CH_2O)_c-H \quad (II)$$

in which:

$R_1$ is a linear or branched alkyl radical comprising 6 to 14 carbon atoms, preferably 8 to 10 carbon atoms;

a, b and c, which may be identical or different, are integers between 1 and 10.

An anti-foaming composition according to the invention may be in concentrated or dilute, ready-to-use form.

When it is in concentrated form, it may comprise from 10 to 50% by weight of at least one compound of formula (I) and from 20% to 70% by weight of at least one nonionic defoaming surfactant.

When it is in dilute form, it may comprise from 0.004% to 10% by weight of at least one compound of formula (I) and from 0.004% to 20% by weight of at least one nonionic defoaming surfactant.

This anti-foaming composition generally comprises a compound of formula (I) and a nonionic defoaming surfactant in a weight ratio of between 1/10 and 10/1, preferably between 1/5 and 5/1.

According to another aspect of the invention, it relates to the use of an anti-foaming composition as defined above as an anti-foaming agent.

According to yet another aspect of the invention, it relates to the use of an alkylpolyglycoside of abovementioned formula (I) as a solubilizing agent for a nonionic defoaming surfactant.

According to yet another aspect of the invention, it relates to cleaning compositions comprising an anti-foaming composition as described above. This cleaning composition according to the invention usually comprises from 2 to 50% by weight of one or more alkaline agents. The alkaline agent used in these compositions is usually sodium hydroxide or potassium hydroxide. The cleaning compositions according to the invention may contain an anti-foaming composition content which is such that the concentration of nonionic defoaming surfactant in the said cleaning composition is between 0.001 and 2% by weight.

DESCRIPTION OF THE PREFERRED EMBODIMENTS

The examples which follow serve to illustrate the present invention.

EXAMPLE 1

The defoaming power of various alkylpolyglucosides (APG) of variable alkyl chain length were tested according to the following procedure:

(i) different solutions comprising the following (% by weight) were prepared:

| | |
|---|---|
| defoaming surfactant (1): | 0.006 |
| APG: | 0.006 |
| alkaline base at a concentration of 10% (2) | 3 |
| Régilait ® milk powder at a 10% dispersion: | 7.5 |
| deionized water | qs 100 |

(1): alcohol of abovementioned formula (II), marketed by the company S.E.P.P.I.C., under the brand name Simulsol™ NW 342

(2): alkaline base comprising (% by weight):

| | |
|---|---|
| sodium tripolyphosphate: | 3.5 |
| sodium metasilicate $5H_2O$: | 4.2 |
| anhydrous sodium carbonate: | 2.3 |
| deionized water | qs 100 |

(ii) The solution was subjected to gentle rotary stirring for three minutes and the height of the foam formed was measured (in mm), after leaving to stand for 5 seconds. The stirring was such that a similar solution, but comprising neither defoaming surfactants nor APG, formed a foam with a height of 30 mm.

The results obtained are featured in Table I.

TABLE I

| APG (alkyl chain) | Foam height (mm) |
|---|---|
| n-hexyl | 10.5 |
| n-octyl | 12.5 |
| 2-ethylhexyl | 10 |
| n-octyl + n-decyl (50/50 mixture by weight) | 15.5 |

These results show that compositions according to the invention comprising an APG whose alkyl chain is a 2-ethylhexyl radical makes it possible to obtain a higher defoaming power than that obtained with a 50/50 mixture of $C_8$–$C_{10}$ APG or with APGs comprising an n-octyl or n-hexyl radical.

It may be noted that a composition comprising no APG but only the defoaming surfactant produces a foam height of 14 mm.

EXAMPLE 2

The solubilizing power of various APGs with respect to Simulsol™ NW 342 was tested according to the following procedure:

100 g of a solution comprising the following (in g) was prepared:

| | |
|---|---|
| • Simulsol ™ NW 342 | 0.1 |
| • NaOH | 5 |
| • $H_2O$ | qs 100 |

the solution obtained is two-phase and cloudy;

various solubilizing agents consisting of APGs containing different alkyl chain lengths, or standard solubilizing agents, namely ammonium xylenesulfonate and ammonium cumenesulfonate, are poured into this two-phase solution;

the introduction of the stabilizing agent is interrupted as soon as the two-phase solution has become totally clear and monophasic;

the weight of solubilizing agent required to obtain a clear solution represents its solubilizing power.

The results obtained are featured in Table II below:

TABLE II

| Solubilizing agent | Weight (in g) of solubilizing agent to obtain a clear solution |
|---|---|
| APG containing n-hexyl chain | 3.5 |
| APG containing 2-ethylhexyl | 0.96 |

TABLE II-continued

| Solubilizing agent | Weight (in g) of solubilizing agent to obtain a clear solution |
|---|---|
| chain | |
| Ammonium xylenesulfonate | 1.6 |
| Ammonium cumenesulfonate | 3 |

These results show that an alkylpolyglucoside comprising an n-hexyl chain has a low solubilizing power, in any case lower than that of a standard solubilizing agent of the cumene and xylene type. On the other hand, an alkylpolyglucoside containing a 2-ethylhexyl chain is of good solubilizing power.

I claim:

1. An anti-foaming composition comprising: a nonionic defoaming surfactant and an alkylpolyglycoside of formula (I):

$$R\,(O)\,Z_n$$

in which:

R represents a 2-ethylhexyl radical,

Z is a sugar residue, and n is between 1 and 5;

wherein said nonionic defoaming surfactant is a compound of formula (II);

(II)

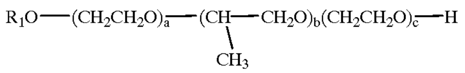

in which:

$R_1$ is a linear or branched alkyl radical comprising 6 to 14 carbon atoms; and a=2, b=4, and c=2.

2. The composition of claim 1, wherein a weight ratio between the compound of formula (I) and the nonionic defoaming surfactant of formula (II) is between 1/10 and 10/1.

3. The composition of claim 2, wherein said weight ratio is between 1/5 and 5/1.

* * * * *